(12) United States Patent
Hwang et al.

(10) Patent No.: US 8,815,970 B2
(45) Date of Patent: Aug. 26, 2014

(54) METHOD OF PREPARING POLYURETHANE

(75) Inventors: Jing-Zhong Hwang, Taipei Hsien (TW);
Guei-Jia Chang, Taipei Hsien (TW);
Jhong-Jheng Lin, Taipei Hsien (TW);
Cheng-Wei Tsai, Taipei Hsien (TW);
Shih-Chieh Wang, Taipei Hsien (TW);
Po-Cheng Chen, Taipei Hsien (TW);
Kan-Nan Chen, Taipei Hsien (TW);
Kan-Nan Chen, Taipei Hsien (TW)

(73) Assignee: Tamkang University (A University of Taiwan), New Taipei (TW)

( * ) Notice: Subject to any disclaimer, the term of this patent is extended or adjusted under 35 U.S.C. 154(b) by 363 days.

(21) Appl. No.: 13/241,165

(22) Filed: Sep. 22, 2011

(65) Prior Publication Data

US 2013/0004677 A1    Jan. 3, 2013

(30) Foreign Application Priority Data

Jun. 29, 2011 (TW) .............................. 100122811 A

(51) Int. Cl.
*A61K 31/355* (2006.01)
*C08J 3/28* (2006.01)
*C08G 71/04* (2006.01)
*D06M 15/564* (2006.01)

(52) U.S. Cl.
CPC ............. *C08G 71/04* (2013.01); *D06M 15/564* (2013.01)

USPC ..................... 522/170; 623/23.58; 623/23.59; 264/494; 522/161; 522/169; 522/173; 522/176; 528/421; 528/403; 528/480; 528/483; 528/503

(58) Field of Classification Search
USPC ........ 264/494; 522/170, 173, 176; 623/23.58, 623/523.59; 528/421, 403, 480, 483, 503
See application file for complete search history.

(56) References Cited

U.S. PATENT DOCUMENTS

| | | | |
|---|---|---|---|
| 5,715,231 A * | 2/1998 | Nagasato et al. | 720/682 |
| 2012/0237701 A1 * | 9/2012 | Hanada et al. | 428/32.64 |

\* cited by examiner

*Primary Examiner* — Sanza McClendon
(74) *Attorney, Agent, or Firm* — Chun-Ming Shih

(57) ABSTRACT

A method of preparing polyurethane prepolymer does not require using a toxic isocyanate monomer (manufactured by harmful phosgene) as a raw material. Epoxy resin and carbon dioxide are used as major raw materials to form cyclic carbonates to be reacted with a functional group oligomer, and then amino groups in a hydrophilic (ether group) or hydrophobic (siloxane group) diamine polymer are used for performing a ring-opening polymerization, and the microwave irradiation is used in the ring-opening polymerization to efficiently synthesize the amino-terminated PU prepolymer, and then an acrylic group at an end is added to manufacture an UV cross-linking PU (UV-PU) oligomer which can be coated onto a fabric surface, and the fabric is dried by UV radiation for a surface treatment to form a washing-resisted long lasting hydrophilic or hydrophobic PU fabric.

16 Claims, 9 Drawing Sheets

METHOD OF PREPARING POLYURETHANE

BACKGROUND OF THE INVENTION

1. Field of the Invention

The present invention relates to a functional polyurethane prepolymer, a method of preparing polyurethane by using the functional polyurethane prepolymer, and an application method thereof, in particular to a functional polyurethane prepolymer prepared by a non-isocyanate route, a method of preparing polyurethane by a using the functional polyurethane prepolymer, and an application method thereof.

2. Description of Related Art

Polyurethane (PU) is a common polymer material widely used as a sports cushion material, an elastomer material, an adhesive material, a waterproof material or a coating material.

In a conventional PU preparation process, the PU is synthesized by using isocyanates (such as diisocyanates and polyisocyanates) and polyols (such as diols or polydhydroxy polyols with high functionality) as major raw materials, but the manufacturing process of this sort usually requires phosgene which is a severely toxic pollutant. If the phosgene is leaked accidentally during the manufacturing process, the phosgene will pose an immediate threat to our environment and jeopardize our health such as causing pulmonary edema, and the manufacturing process itself will lead to a certain degree of risk. Therefore, scientists attempt to use non-isocyanates routes (which use absolutely no isocyanates at all) to manufacture polyurethane (PU).

In 1993, Takeshi Endo proposed a PU manufacturing method without using any diisocyanates, wherein five-membered cyclic carbonates (Bis(cyclic carbonate)s) and primary amines are reacted at room temperature to produce a high yield of β-position hydroxyl PU (2-Hydroxyethylurethane), and the reaction is represented by the following chemical equation:

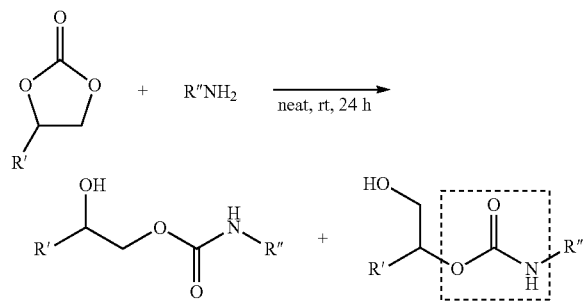

Typically, the starting material (cyclic carbonate) of hydroxyl PU is prepared by a nucleophilic ring opening reaction of oxirane and carbon dioxide. As indicated in past literatures, cyclic carbonate is mainly prepared by a reaction of oxirane, carbon dioxide, and a catalyst at high pressure, and the common catalysts include amine, phosphine, quaternary ammonium salt, antimony compound, porpyrin and transition metal complex, and the manufacturing conditions and process involve a high level of difficulty. Until recent years, the ring opening reaction of oxirane and carbon dioxide taken place at normal pressure (1 atmosphere) was developed.

Professor Takeshi Endo, et al. further published a preparation of hydroxyl PU by using di-functional amines and di-functional cyclic carbonates, and subsequent research reports related to the ring opening reaction of cyclic carbonates provided the related reaction conditions, and specifically pointed out that the ring opening reaction has a high chemoselectivity, and will not be affected by existing water, alcohols, or esters, so that the cyclic carbonate can be reacted with a compound containing a primary amine under appropriate reaction conditions for a ring-opening polymerization, and the reaction is represented by the following chemical equations:

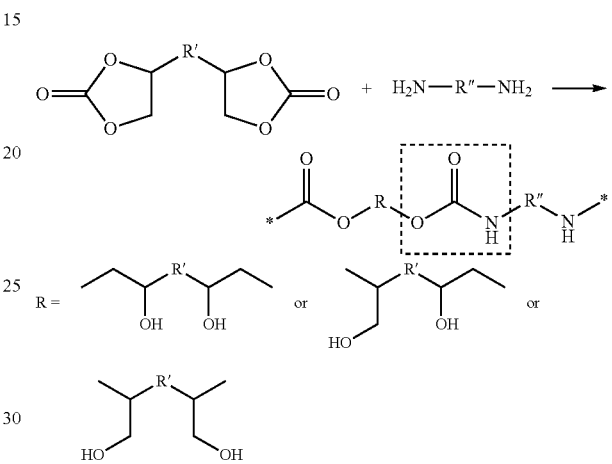

However, the aforementioned method is developed for the PU prepolymer with an amino functional group at an end and having a maximum average molecular weight falling within the range from 5000 g/mole to 8000 g/mole. The ring opening reaction process of the aforementioned method requires a time (20 hours or more), and this product cannot be applied for a coating application directly and effectively.

SUMMARY OF THE INVENTION

The present invention provides a method of preparing a polyurethane (PU) prepolymer, and the method does not use any conventional isocyanate as a raw material, and the manufacturing process does not require the use of phosgene. Epoxy resin and carbon dioxide are used as major raw materials for the preparation of the macromolecular polyurethane prepolymer.

The preparation method of the present invention comprises the following steps:

(1) Material mixing: An epoxy resin and a catalyst are mixed uniformly until the epoxy resin is dissolved completely to form a mixed raw material; and (2) Thermal reflux: Carbon dioxide gas is introduced into the mixed raw material, and a thermal reflux is performed at a high temperature for a predetermined time to form a bis-(cyclic carbonate) containing compound (BCC).

The aforementioned reaction is represented by the following chemical equations:

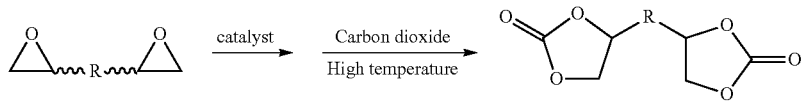

wherein R is

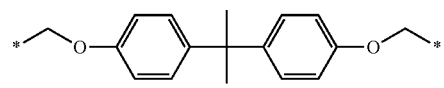

or

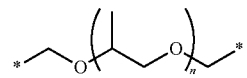

or

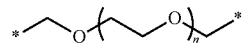

or

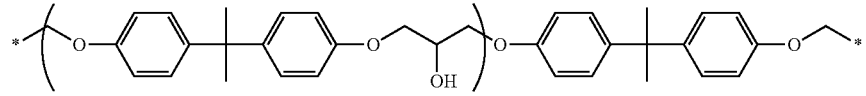

(3) Ring-opening polymerization: After a bis-(cyclic carbonate) containing compound (BCC) and a di-amine, compound are mixed uniformly, and the ring-opening polymerization is represented by the following chemical equations:

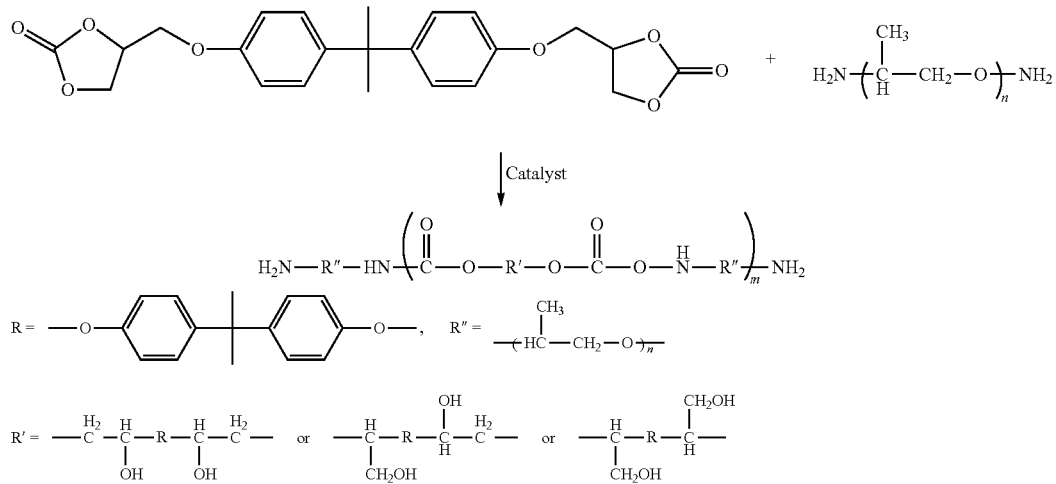

(4) The amino-terminated PU prepolymer (obtained from the above reaction) is mixed and reacted with a di-acrylate compound (AHM) via a Michael addition to obtain an UV curable polyurethane, and the Michael addition is represented by the following chemical equations:

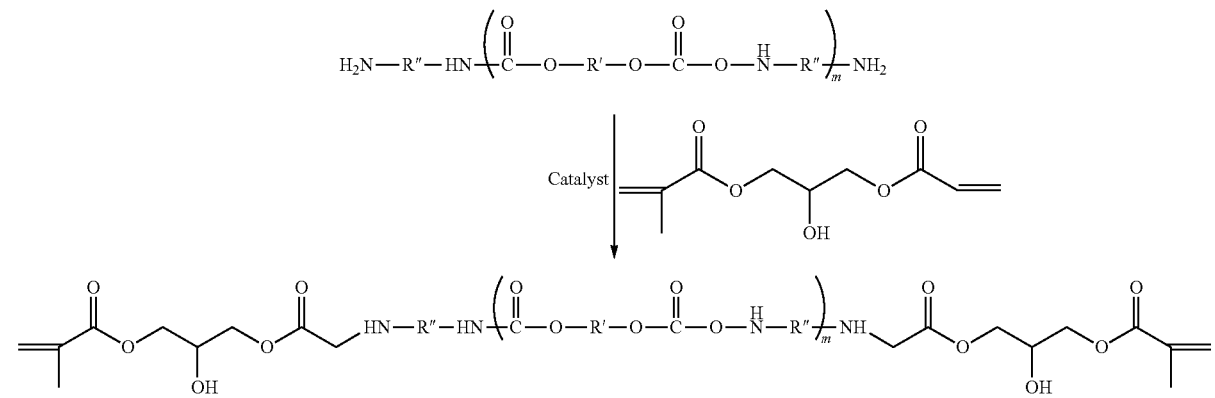

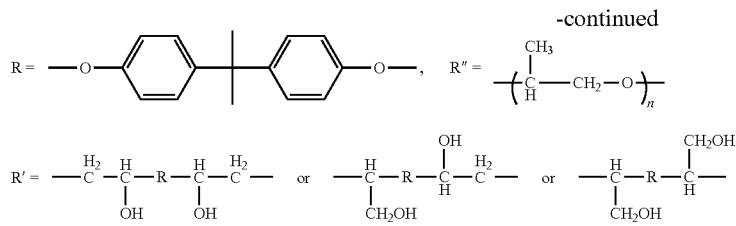

The present invention further provides a method of preparing polyurethane comprising the following steps:
(1) Material mixing: An epoxy resin and a first catalyst are mixed uniformly until the epoxy resin is dissolved completely to form a mixed raw material;
(2) Thermal reflux: Carbon dioxide gas is introduced into the mixed raw material, and a thermal reflux is performed at a high temperature for a predetermined time to form a bis-cyclic carbonate-containing oligomer;
(3) Microwave reaction: The bis-cyclic carbonate-containing oligomer is mixed with a second catalyst uniformly, and then a ring-opening polymerization with one or more di-amine compound is performed to form a PU prepolymer containing an amino group at an end; and
(4) Michael reaction: The aforementioned PU prepolymer with mixed with a third catalyst uniformly, and then a compound with an acrylic functional group is added to perform a Michael reaction at a low temperature to form an UV curable polyurethane.

The present invention further provides an application method of polyurethane, wherein the polyurethane is produced by using an epoxy resin, carbon dioxide and a polyamine compound as major raw materials, and the application method comprises the following steps:
(1) Dipping: An UV curable PU (UV-PU) material and a photoinitiator are mixed uniformly to form a PU raw material solution, and a fabric is placed into the PU raw material solution for pressure suction. Make sure the fabric absorbs a sufficient amount of the PU raw material.
(2) Photoreaction: The treated fabric is placed into a medium pressure mercury lamp UV irradiation is provided for fixing the PU raw material solution onto a surface of the fabric.

The method of the present invention does not require the conventional use of isocyanates and polyols as raw materials for preparing PU, and epoxy resin and carbon dioxide, and then di-amine oligomer are used as starting raw materials and polyamines are added to prepare the PU prepolymer, and the PU prepolymer produced by this method can be further used for synthesizing an UV curable PU (UV-PU) in a simple and convenient manner, and the UV-PU can be further coated onto a fabric surface, and the fabrics with UV-cured PU surface treatment is adopted to form a washing resisting and long-lasting hydrophilic or hydrophobic PU treated fabrics.

BRIEF DESCRIPTION OF THE DRAWINGS

The invention, as well as its many advantages, may be further understood by the following detailed description and drawings in which.

DETAILED DESCRIPTION OF THE INVENTION

In the first preferred embodiment, the polyurethane (PU) prepolymer is prepared by an epoxy resin which is polypropylene glycol diglycidyl ether (PPG-DGE), and the aforementioned polyurethane prepolymer is used for manufacturing polyurethane (PU) and UV curable polyurethane (UV-PU), and the UV curable polyurethane (UV-PU) is further applied as a water-resisting material.

(1) Method of Preparing Polyurethane Prepolymer:
In this preferred embodiment, the polyurethane prepolymer is bis(cyclic carbonate) which is a PPG-type cyclic carbonate, the epoxy resin is polypropylene glycol diglycidyl ether (PPG-DGE), and the catalyst is lithium bromide (LiBr), and the method of preparing a PU prepolymer comprises the following steps:
(S11) Material mixing: PPG-DGE (5 moles) and lithium bromide (5 mole percents) are mixed uniformly until the PPG-DGE is dissolved completely to form a mixed raw material; and
(S12) Thermal reflux: Carbon dioxide gas is introduced into the mixed raw material, and a thermal reflux is performed at the pressure of one atmosphere and a temperature of 100° C. for 24 hours to form a bis(cyclic carbonate) product.

In this preferred embodiment, a large quantity of deionized water and ethyl acetate are used for rinsing the bis(cyclic carbonates) product to remove remained catalysts and achieve the purification effect, so as to obtain a highly pure transparent colorless bis(cyclic carbonate) liquid.

Figure 1A:
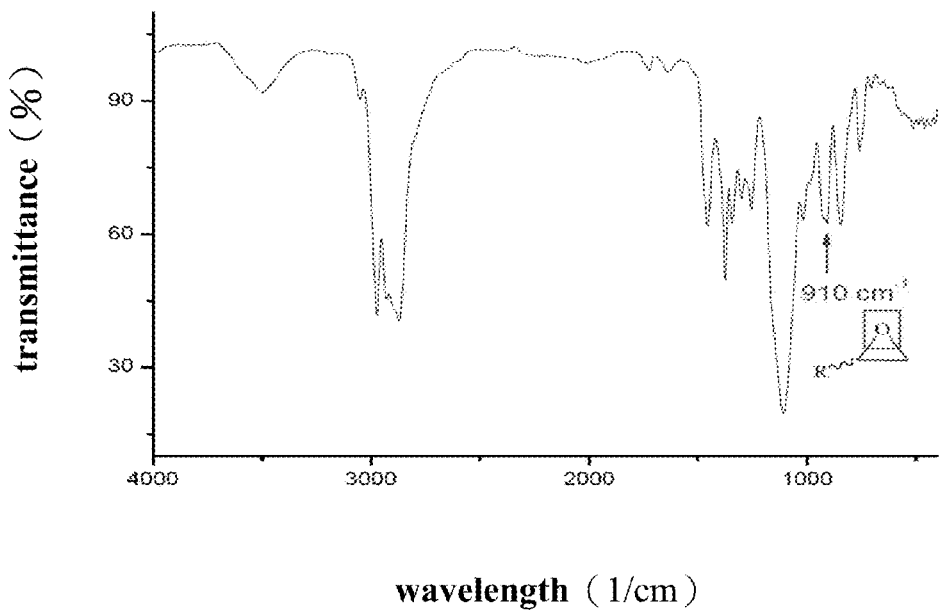
FIG. 1A shows a Fourier infrared spectrum of polypropylene glycol diglycidyl ether (PPG-DGE) used in a first preferred embodiment of the present invention.
Figure 1B:
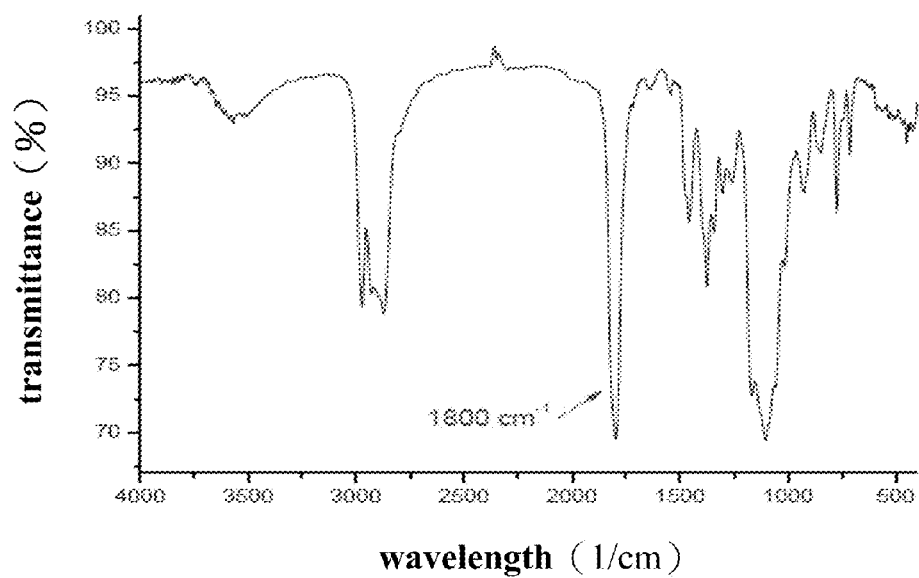
FIG. 1B shows a Fourier infrared spectrum of PPG-type cyclic carbonates formed in the first preferred embodiment of the present invention.

With reference to FIGS. 1A and 1B, a Fourier-transformed infrared spectroscopy is used for detecting and tracing the elimination state of the epoxy functional group (910 cm$^{-1}$) and the formation state of the cyclic carbonate functional group (1800 cm$^{-1}$). The Fourier infrared spectra show that the epoxy functional group is fully converted into the cyclic carbonate functional group.

(2) Method of Preparing PU Prepolymer Containing an Amino Group at an End:

The bis(cyclic carbonates) product produced by the aforementioned method can be used for manufacturing a PU prepolymer containing an amino group at an end, and the method comprises the following steps:

(S21) Microwave treatment: The aforementioned bis(cyclic carbonate) product (0.1 mole), lithium bromide (5 mole percents) and Jeffamine compound (a di-amine D-2000, 0.15 mole) are mixed uniformly, and then a microwave reactor with the power of 100 W is provided for performing a ring-opening polymerization for half an hour to form a PU prepolymer containing an amino group at an end.

Figure 2:
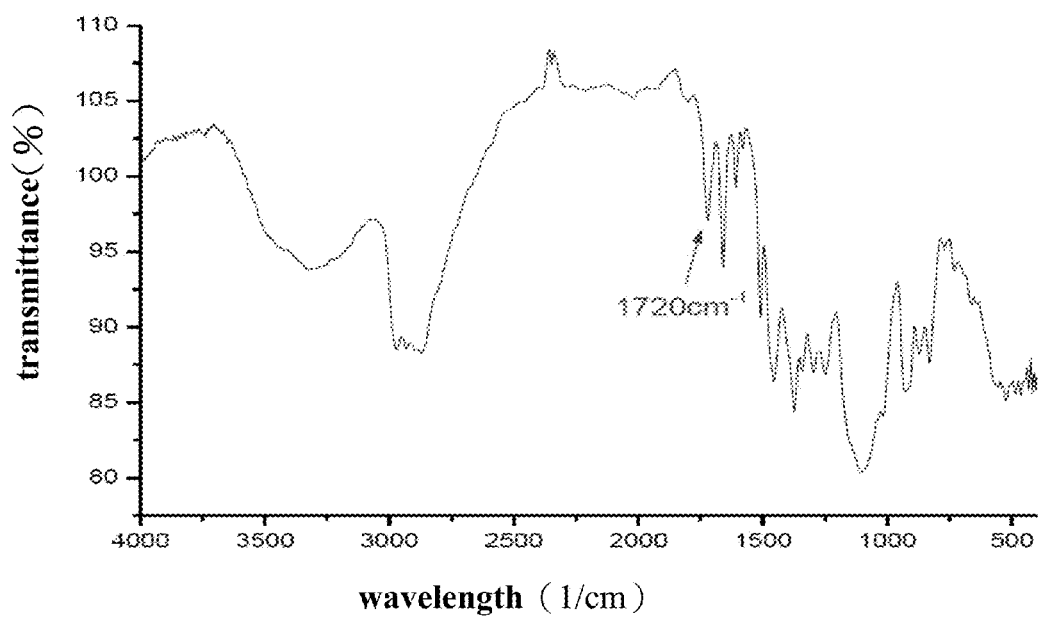
FIG. 2 shows a Fourier infrared spectrum of polyurethane (PU) formed in the first preferred embodiment of the present invention.

With reference to FIG. 2 for a Fourier-transformed infrared spectrum of PU obtained in accordance with the preparation method of the present invention, a formation of an amino ester functional group is observed at the wavelength of 1720 cm$^{-1}$, indicating that the cyclic carbonate functional group (1800 cm$^{-1}$) of the cyclic carbonate functional group in this step will disappear with the reaction time, and will be converted into an amino ester functional group (1720 cm$^{-1}$).

In the microwave treatment step (S21), the Jeffamine compound is a polyamine compound well known to those ordinarily skilled in the art, and the compound used in this preferred embodiment is one selected from the group of hydrophilic aliphatic diamines (such as 1,4-butanediol bis-3-aminopropyl ether), ethylene diamines, aliphatic diamines (such as 1,12-diaminododecane), aromatic diamines (such as m-xylyene diamine) or a hydrophobic diamine compounds, such as polydimethylsiloxane (PDMS) diamine.

In addition, the microwave treatment step (S21) further selectively adds a solvent for a dilution to reduce the viscosity of the reactants, wherein the solvent can be ethyl lactate (EL), and the quantity of EL in this preferred embodiment is equal to 10 mL, and the Fourier infrared spectrum of the PU containing an amino group at an end after the reaction takes place is the same as that of the one added with a catalyst.

Further, microwave intensity used in the microwave treatment step (S21) can be adjusted to a range from 15 W to 150 W, and the microwave treatment time can be adjusted to a range from 0.5 hour to 2 hours.

(3) UV Curable Polyurethane (UV-PU):

The PU prepolymer formed in accordance with the aforementioned method can be further used for manufacturing an UV-PU, and the method comprises the following steps:

(S31) Michael reaction: The aforementioned PU prepolymer and a catalyst (triethyl amine, TEA) (5 mole percents) are mixed uniformly, and then 20 mL of ethyl acetate is added, and the mixed materials are dropped slowly into 0.2 mole of a compound containing diacrylate at 0° C. (or in an ice bath), and the Michael reaction is performed in the ice both for 24 hours to remove the catalyst TEA and ethyl acetate to produce an UV-PU material.

In the Michael reaction step (S31), the ethyl acetate solvent may not be added for the reaction.

(4) Application of UV-PU:

The UV-PU material obtained in accordance with the method of the present invention can be used for forming a mesh bonding on a fabric surface and can be embedded into the surface of fiber bundles easily, so that the hydrophilic polymer in the fabric will not be changed or lost easily by rinsing, and the original hydrophilic property of the hydrophilic resin can be maintained, so as to obtain the long-lasting rinsing-resisting super-absorbent fabric, and the application method comprises the following steps:

Dipping: The aforementioned UV-PU material is diluted by ethyl acetate (EA) to the concentration of 1~10 wt %, and 5 phr of photoinitiator benzoin alkyl ether (1173) is added to form a UV-PU solution, and different fabrics (PET) are placed into the aforementioned UV-PU solution for pressure suction. After the fabric sufficiently absorbs the solution, and a fabric is placed into the PU raw material solution for pressure suction and make sure the fabric absorbs a sufficient amount of PU raw material.

Photoreaction: The aforementioned fabric is placed into a medium pressure mercury lamp UV irradiation for fixing the PU raw material solution onto the treated fabric to form a double-bond methyl acrylic functional group in of the UV-PU material, and a radical cross-linking reaction is performed to produce a mesh bonding, and the UV-PU material can be embedded into a surface of the fiber bundles easily, so that the hydrophilic polymer in the fabric will not be damaged or lost easily by rinsing, and the original hydrophilic property of the hydrophilic resin can be maintained, so as to obtain the long-lasting washing-resisting super-absorbent fabric.

Figure 3:
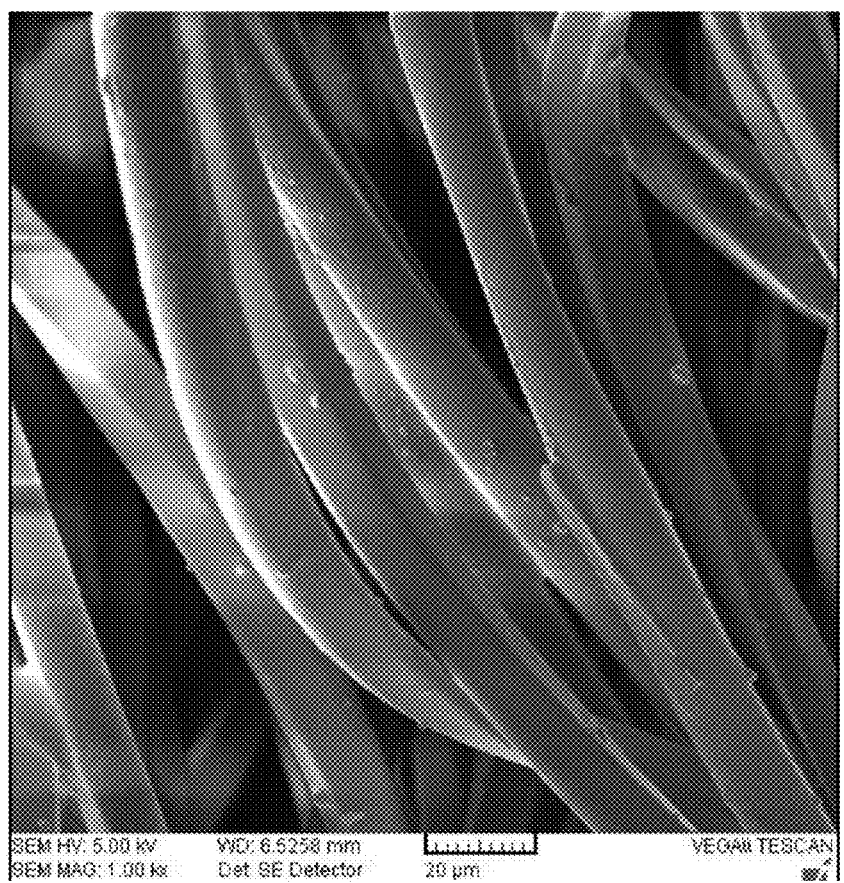
FIG. 3 is a SEM photo of the produced UV curable polyurethane coated onto surfaces of fabric fibers and washed by water for 30 times in accordance with the first preferred embodiment of the present invention.
Figure 4A:
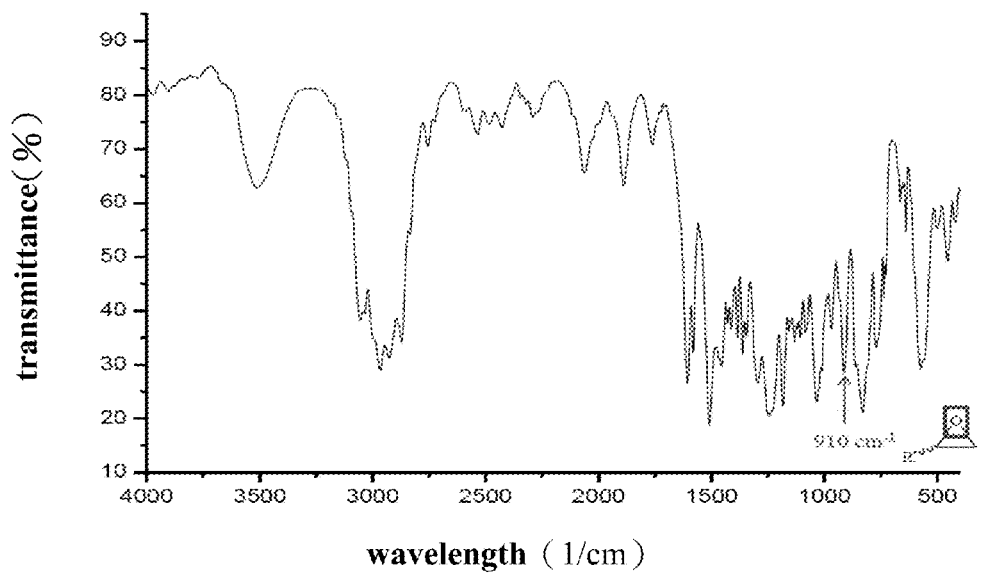
FIG. 4A shows a Fourier infrared spectrum of bisphenol A epoxy resin used in a second preferred embodiment of the present invention.
Figure 4B:
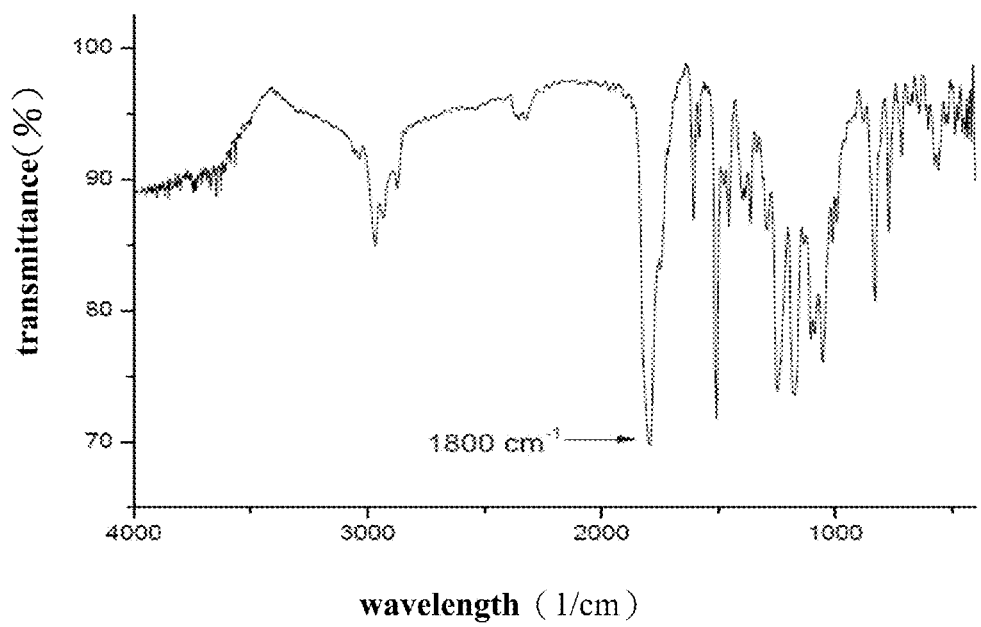
FIG. 4B shows a Fourier infrared spectrum of bis(cyclic carbonates) (BCC) formed in the second preferred embodiment of the present invention.
Figure 5:
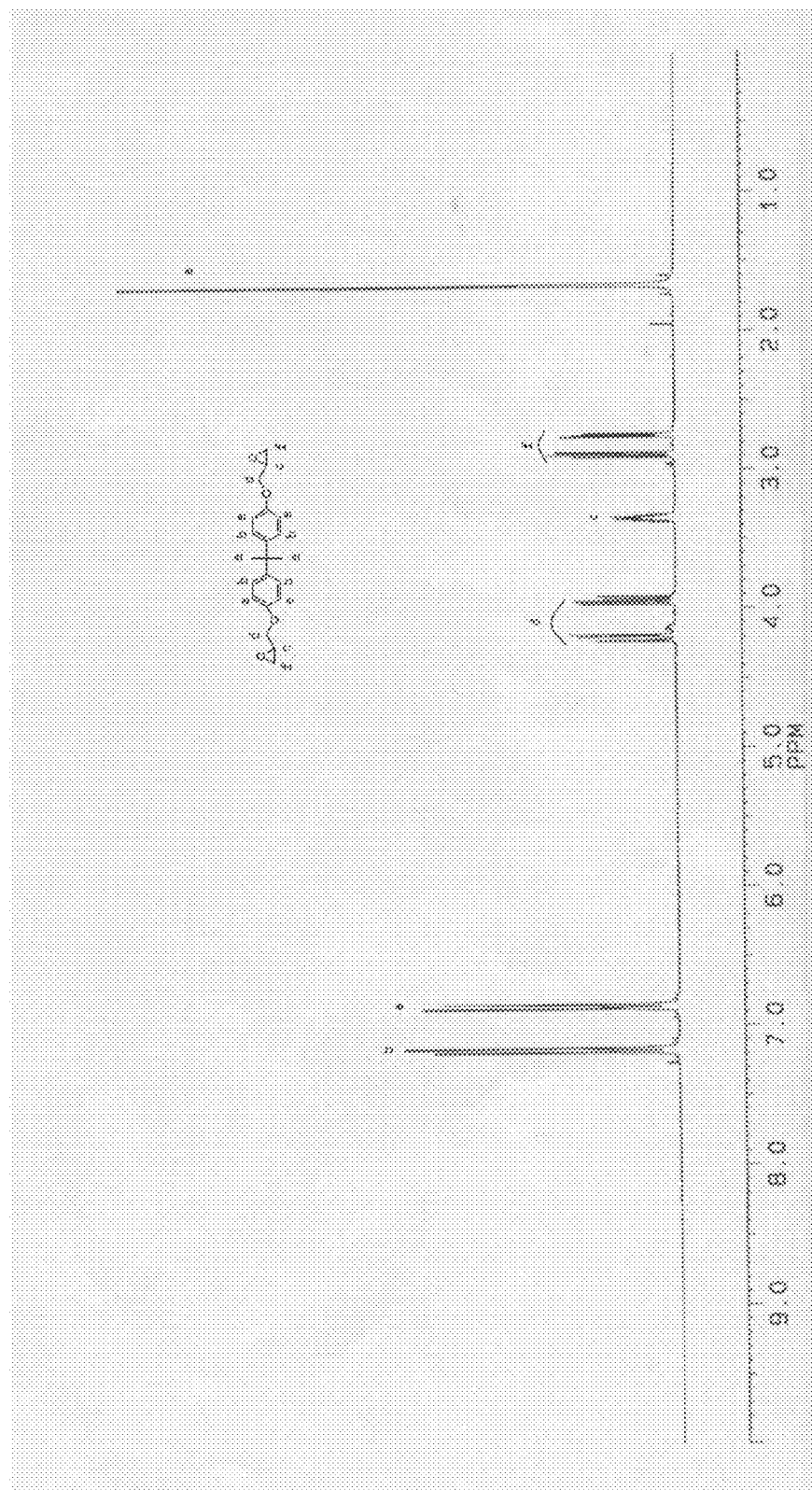
FIG. 5 shows a $^1H$ NMR spectrum of bisphenol A epoxy resin used in the second preferred embodiment of the present invention.
Figure 6A:
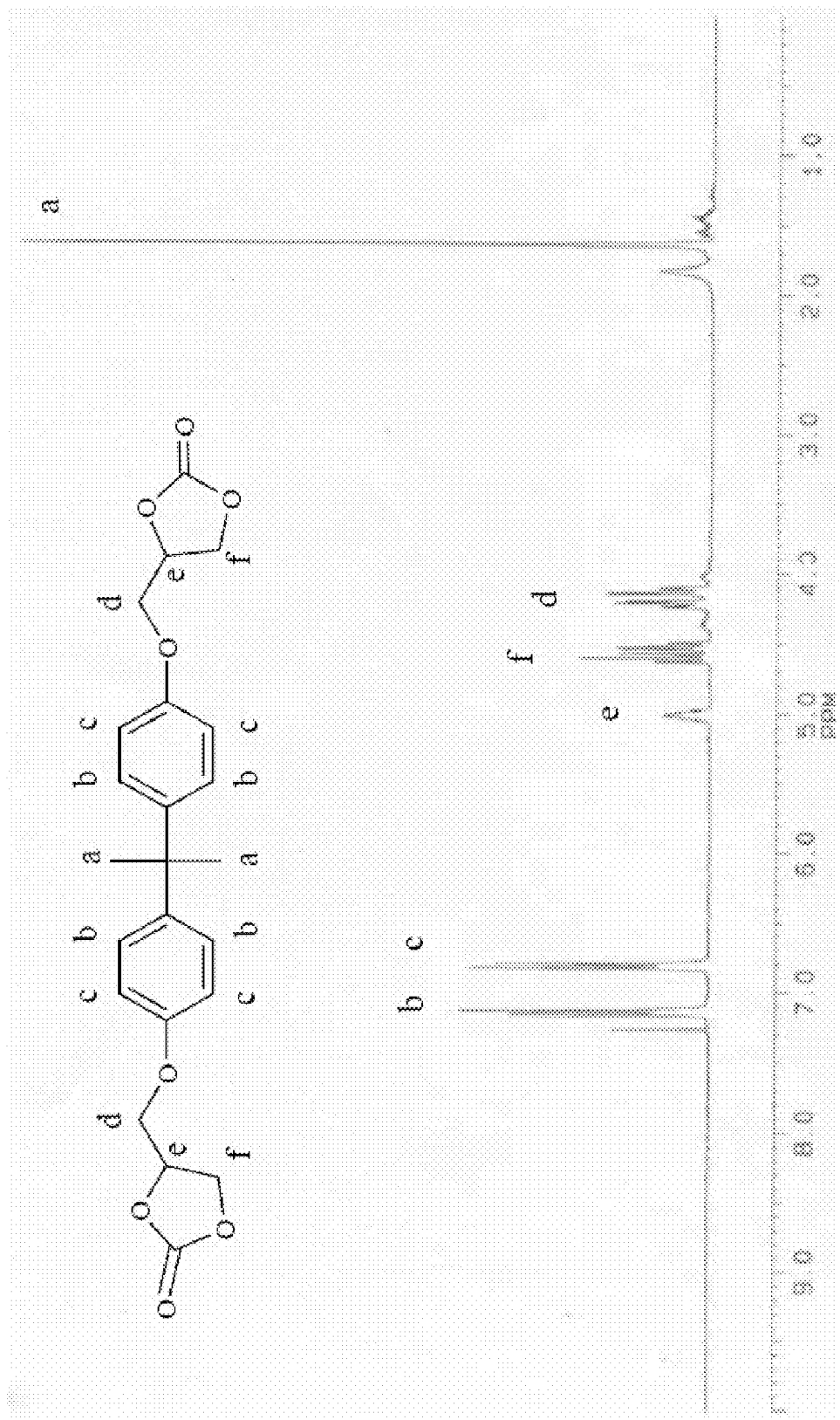
FIG. 6A shows a $^1H$ NMR spectrum of bis(cyclic carbonates) (BCC) formed in the second preferred embodiment of the present invention.
Figure 6B:
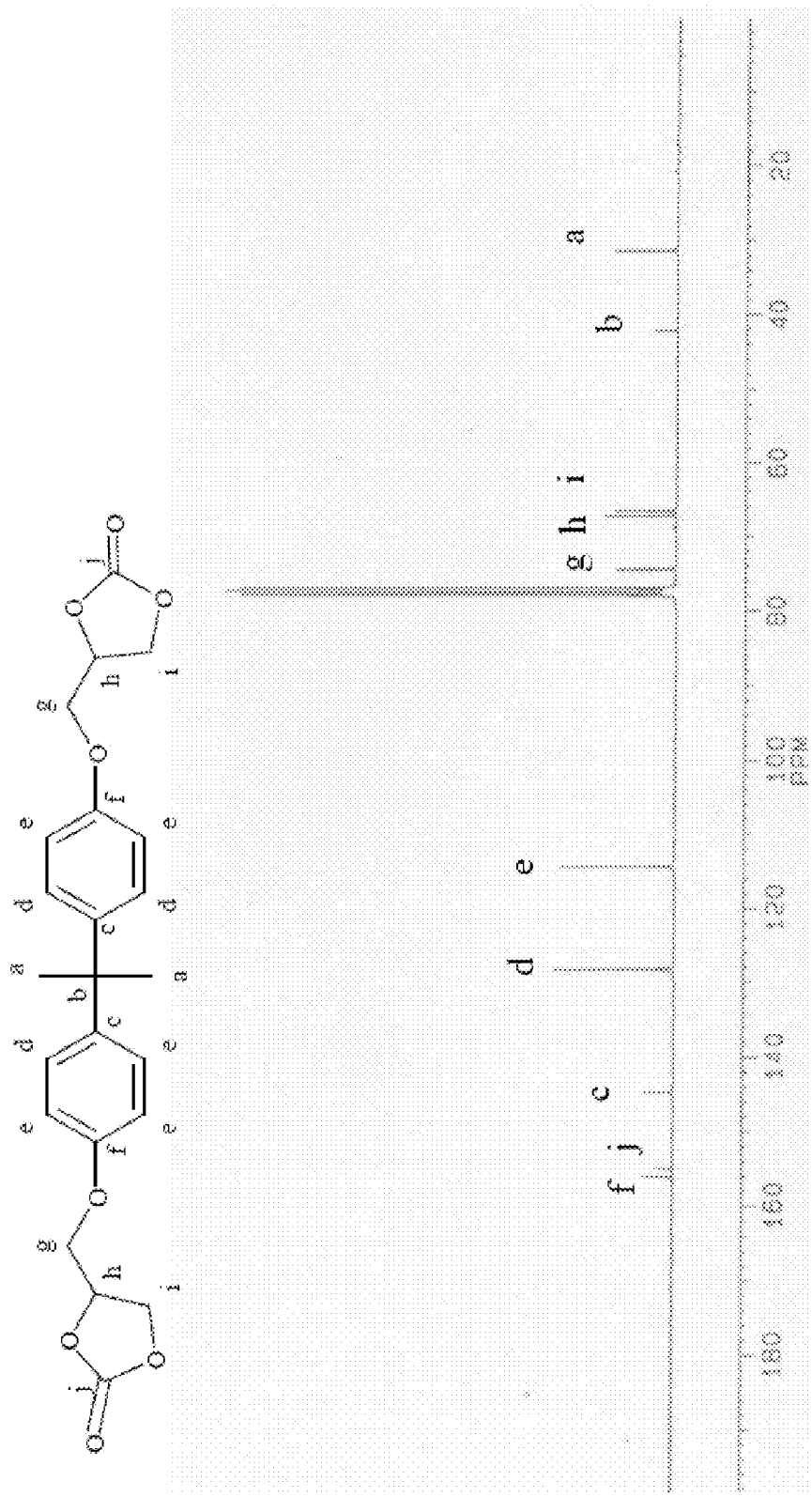
FIG. 6B shows a $^{13}C$ NMR spectrum of bis(cyclic carbonates) (BCC) formed in the second preferred embodiment of the present invention; spectrum.

With reference to FIG. 3 for a SEM photo of the produced UV-PU solution coated onto surfaces of fabric fibers and washed by water for 30 times in accordance with the first preferred embodiment of the present invention, the photo shows that the high-density mesh bonding formed by the UV-PU material on the fabric surface is not damaged or lost by rinsing, and the original hydrophilic property of the hydrophilic resin is maintained.

In this preferred embodiment, the photoinitiator is a photosensitizing agent such as benzophenone (BP) or a reactive diluent with acrylic double bonds is added into the UV-PU solution to increase the concentration of the acrylic double bonds, so as to enhance the crosslink density of the UV-PU material.

In the second preferred embodiment, bisphenol A epoxy resin such as diglycidyl ether bisphenol A (DGEBA) is used as the epoxy resin for preparing the polyurethane prepolymer, and the aforementioned polyurethane prepolymer is used for manufacturing polyurethane (PU) and UV cross-linking polyurethane (UV-PU), and the UV cross-linking polyurethane (UV-PU) is further applied as a water-resisting coating material.

(1) Method of Preparing Polyurethane Prepolymer:

In this preferred embodiment, the bis(cyclic carbonates) (BCC) so formed is a polyurethane prepolymer, the epoxy resin is di-glycidyl ether of bisphenol A (DGEBA), and the catalyst is lithium bromide (LiBr). The method of preparing a polyurethane prepolymer comprises the following steps:

(S11) Material mixing: DGEBA (5 moles) and lithium bromide (5 mole percents) are mixed uniformly until the DGEBA is dissolved completely to form a mixed raw material; and (S12) Thermal reflux: Carbon dioxide gas is introduced into the mixed raw material, and a thermal reflux is performed at a pressure of one atmosphere and a temperature of 100° C. for 24 hours to form a BCC product (or oligomer).

The BCC product obtained in accordance with this preferred embodiment can be rinsed by a large quantity of deionized water to remove remained catalyst and solvent to achieve the purification effect, and then baked and dried to a fine pure white BCC powder.

With reference to FIGS. 4A, 4B, 5, 6A and 6B for Fourier infrared spectra that detect the elimination state of the epoxy functional group (910 cm$^{-1}$) and the formation state of the cyclic carbonate functional group (1800 cm$^{-1}$), the Fourier infrared spectra show that the epoxy functional group is sufficiently converted into the cyclic carbonate functional group. In addition, a nuclear magnetic resonance (NMR) is used for performing a structure analysis to confirm the molecular structure of the BCC product produced in according to the procedure of this preferred embodiment.

(2) Method of Preparing a PU Prepolymer Containing an Amino Group at an End:

The BBC product produced in accordance with the aforementioned method can be used for preparing a PU prepolymer, and the preparation method comprises the following steps:

(S21) Microwave treatment: The aforementioned BBC product (0.1 mole), lithium bromide (5 mole percents) and aliphatic amine which is Jeffamine D-2000 (0.15 mole) are mixed uniformly, and a microwave reactor with the power of 100 W is provided for performing a ring-opening polymerization for half an hour to form a PU prepolymer containing an amino group at an end.

Figure 7:
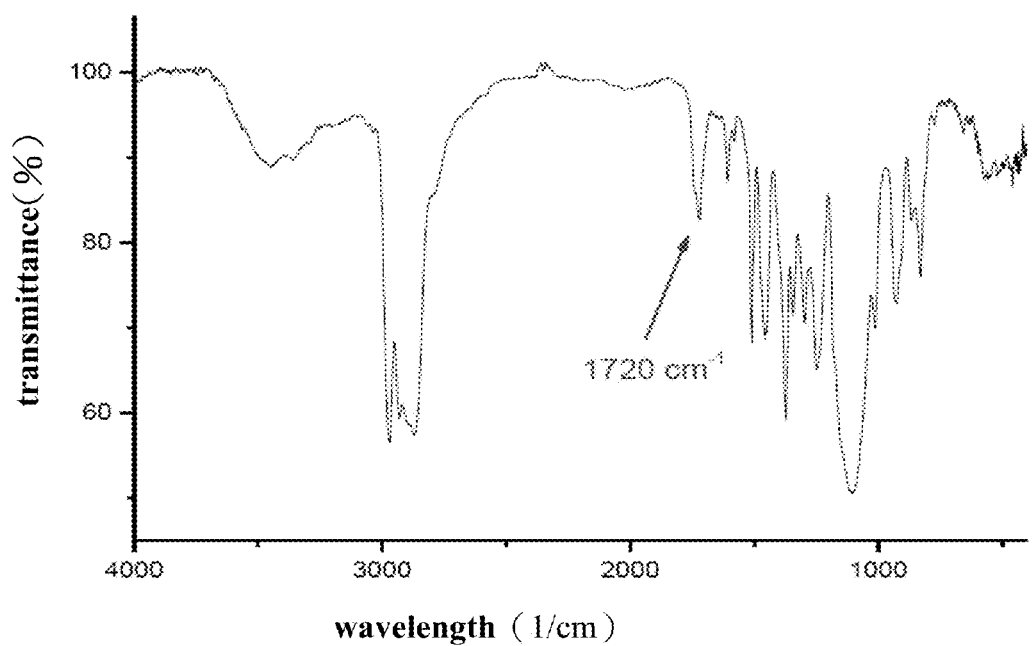
FIG. 7 is a Fourier infrared spectrum of polyurethane (PU) formed in the second preferred embodiment of the present invention.

With reference to FIG. 7 for a Fourier-transformed infrared spectrum of PU obtained by this method, a formation of an amino ester functional group is observed at the wavelength of 1720 cm$^{-1}$. In this step, the cyclic carbonate functional group (1800 cm$^{-1}$) in the cyclic carbonate functional group disappears with the reaction time and is converted into an amino ester functional group (1720 cm$^{-1}$). The PU prepolymer formed by this method has a molecular weight of 20000 g/mole or above, which can be used more easily in the following applications.

In the microwave treatment step (S21), a solvent can be added to dilute the solution and reduce the viscosity of the reactants, wherein the solvent is ethyl lactate (EL) or ethyl acetate (EA), and the quantity of the solvent used in this preferred embodiment is equal to 10 mL, and the Fourier infrared spectrum of the produced PU prepolymer containing an amino group at an end shows the same result with the one added with a catalyst.

(3) Method of Preparing UV Curable Polyurethane (UV-PU):

The PU prepolymer produced according to the aforementioned method can be used for preparing the UV-PU, and the preparation method comprises the following steps:

(S31) Michael reaction: The aforementioned PU prepolymer and a catalyst (triethyl amine, TEA) (5 mole percents) are mixed uniformly, and then 20 mL of ethyl acetate is added, and 0.2 mole of a compound containing diacrylate is dropped into the solution slowly at 0° C. (or in an ice bath), and then the Michael reaction is performed in the ice bath for 24 hours to remove the catalyst TEA and ethyl acetate to produce an UV-PU material.

In the Michael reaction step (S31), the solvent ethyl acetate solvent may not be used in the reaction.

In this preferred embodiment, the compound containing diacrylate is 3-Acryloyloxy-2-hydroxypropyl methacrylate.

(4) Application of UV-PU:

The UV-PU material obtained according to the method of the present invention method can be used to form a mesh bonding on a fabric surface and can be embedded into a surface of fiber bundles successfully, so that the hydrophilic polymer in the fabric will not be changed or lost easily by rinsing, and the original hydrophilic property of the hydrophilic resin can be maintained, the long-lasting washing-resisting super-absorbent fabric. The application method comprises the following steps:

Dipping: The aforementioned UV-PU material is diluted by ethyl acetate (EA) to a concentration of 1~10 wt %, and then 5 phr of photoinitiator such as benzoin alkyl ether, (1173) is assed to form a UV-PU solution, and various different fabrics (PET, cotton) are placed into the UV-PU solution for pressure suction and make sure that the fabric absorbs a sufficient amount of PU raw material.

Photoreaction: The aforementioned fabric is placed into a medium pressure mercury lamp UV irradiation for fixing the PU raw material solution onto the treated fabric to form a double-bond methyl acrylic functional group in of the UV-PU material, is used for performing a radical cross-linking reaction of the double-bond methyl acrylic functional group in the UV-PU material to produce a mesh bonding, and the UV-PU material can be embedded into the surface of fiber bundles successfully, so that the hydrophilic polymer in the fabric will not be damaged or lost easily by rinsing, and the original hydrophilic property of the hydrophilic resin can be maintained, so as to obtain the long-acting washing-resisting super-absorbent fabric.

Figure 8:
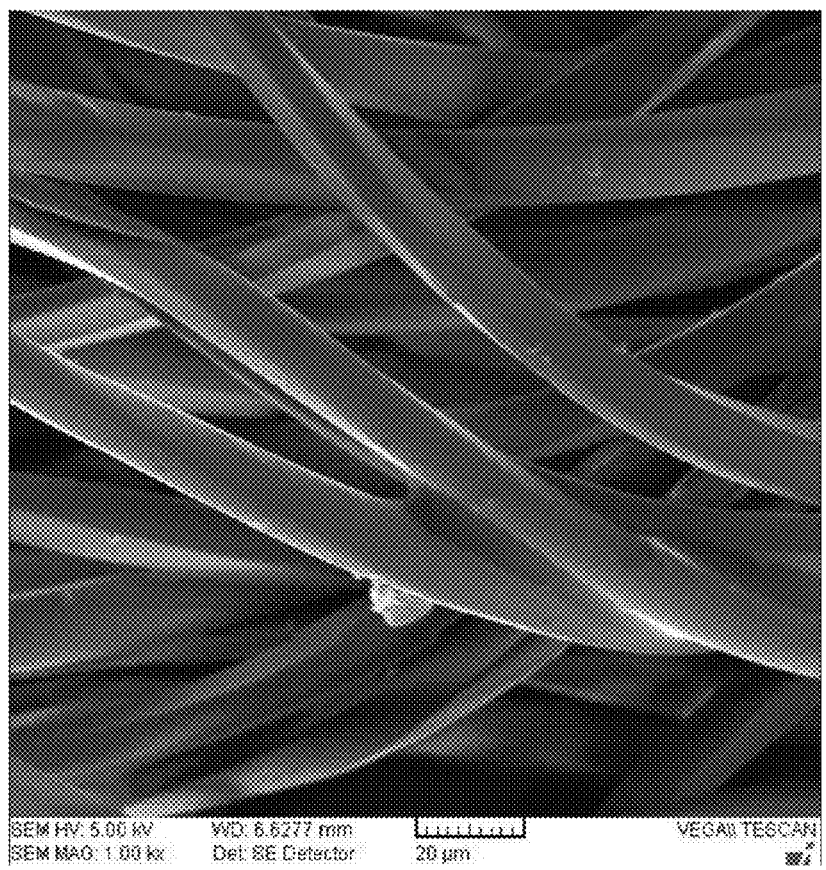
FIG. 8 shows a SEM photo of the produced UV cross-linking polyurethane coated onto surfaces of fabric fibers, processed by a UV light bridge, and washed by water for 30 times in accordance with the second preferred embodiment of the present invention.

With reference to FIG. 8 for a SEM photo of the produced UV cross-linking polyurethane coated onto surfaces of fabric fibers and washed by water for 30 times in accordance with the second preferred embodiment of the present invention, the SEM photo shows that the high-density mesh bonding of the UV-PU material formed on the fabric surface is not damaged or lost by rinsing, and the original hydrophilic property of the hydrophilic resin is maintained.

In this preferred embodiment, the photoinitiator is a photosensitizing agent such as benzophenone (BP) or a reactive diluent with acrylic double bonds is added into the UV-PU solution to improve the crosslink density of the UV-PU material.

In this preferred embodiment, the epoxy resin is bisphenol A epoxy resin or di-glycidyl ether of bisphenol A (DGEBA). However, the invention is not limited to these substances only, but any equivalent epoxy resin such as Epoxy-128, Epoxy-506, Epoxy-904, aliphatic epoxy resin, PPG-DGE, PEG-DGE and any combination of the above can be used in the present invention as well.

In summation of the description above, the present invention provides a novel process for manufacturing the polyurethane prepolymer and the UV curable polyurethane without using isocyanates and polyols as raw materials, so as to avoid the use of harmful substance such as phosgene and reduce the risk of harming our environment. In addition, the method of the present invention is simple and convenient and requires no specific ambient conditions. Compared with the conventional preparation methods, the present invention has the advantages of protecting the environmental and achieving the energy-saving and carbon reduction effects.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A method of preparing polyurethane, using an epoxy resin, carbon dioxide and a polyamine compound as major raw materials, comprising the following steps:
    a material mixing step, wherein an epoxy resin and a catalyst are mixed uniformly until the epoxy resin is dissolved completely to form a mixed raw material;
    a thermal reflux step, wherein carbon dioxide gas is introduced into the mixed raw material, and then a thermal reflux is performed at a high temperature for a predetermined time to form a bis-(cyclic carbonate) containing compound (or oligomer);
    a microwave treatment step, wherein the bis-(cyclic carbonate) containing compound (or oligomer), a catalyst and a polyamine compound are mixed uniformly, and then a microwave reactor is used for performing a ring-opening polymerization for a predetermined time to form the PU prepolymer containing an amino group at an end; and
    a Michael reaction step, wherein the PU prepolymer containing an amino group at an end is mixed uniformly with a catalyst, and then the mixed solution is dropped slowing into at a compound containing diacrylate a low temperature, and the Michael reaction is performed at the low temperature to obtain an a UV cross-linking (curable) polyurethane (UV-PU).

2. The method of claim 1, wherein the epoxy resin is a compound selected from the group of bisphenol A epoxy resin (DGEBA), di-glycidyl ether of bisphenol A, Epoxy-128, Epoxy-506, Epoxy-904, aliphatic epoxy resin, PPG-DGE, PEG-DGE and mixtures thereof.

3. The method of claim 1, wherein the catalyst used in the material mixing step is lithium bromide.

4. The method of claim 1, wherein the high temperature is 100° C.

5. The method of claim 1, wherein the thermal reflux time falls within a range from 12 hours to 24 hours.

6. The method of claim 1, wherein the material mixing step further adds a solvent.

7. The method of claim 1, wherein the microwave treatment step further adds a dilute solvent.

8. The method of claim 7, wherein the dilute solvent is ethyl acetate or ethyl lactate.

9. The method of claim 1, wherein the catalyst used in the microwave treatment step is lithium bromide.

10. The method of claim 1, wherein the microwave reactor is operated at a time from 0.5 hour to 2 hours.

11. The method of claim 1, wherein the microwave reactor has a microwave power falling into a range from 15 W to 150 W.

12. The method of claim 1, wherein the low temperature of the Michael reaction is equal to 0° C.

13. The method of claim 1, wherein the polyamine compound is one selected from the group of Jeffamine® series, hydrophilic aliphatic diamine (including 1,4-Butanediol bis-3-aminopropyl ether), ethylene diamine, aliphatic diamine (including 1,12-diaminododecane), aromatic diamine (including m-Xylyene diamine) and hydrophobic diamine compound.

14. The method of claim 1, wherein the compound containing diacrylate is 3-Acryloyloxy-2-hydroxypropyl methacrylate.

15. The method of claim 1, wherein the microwave treatment step of the Michael reaction adds a dilute solvent.

16. The method of claim 15, wherein the dilute solvent is ethyl acetate.

* * * * *